(12) United States Patent
Johnson

(10) Patent No.: US 12,463,434 B2
(45) Date of Patent: Nov. 4, 2025

(54) SYSTEM AND METHOD FOR INSTALLING A CROSS ARM ON A UTILITY POLE

(71) Applicant: Terex USA, LLC, Norwalk, CT (US)

(72) Inventor: Corey Scott Johnson, Watertown, SD (US)

(73) Assignee: Terex USA, LLC, Norwalk, CT (US)

( * ) Notice: Subject to any disclaimer, the term of this patent is extended or adjusted under 35 U.S.C. 154(b) by 0 days.

(21) Appl. No.: 18/581,055

(22) Filed: Feb. 19, 2024

(65) Prior Publication Data

US 2024/0417995 A1 Dec. 19, 2024

Related U.S. Application Data

(63) Continuation of application No. 17/063,091, filed on Oct. 5, 2020, now Pat. No. 11,905,724, which is a continuation of application No. 15/440,957, filed on Feb. 23, 2017, now Pat. No. 10,794,079.

(60) Provisional application No. 62/299,264, filed on Feb. 24, 2016.

(51) Int. Cl.
*H02J 7/00* (2006.01)
*B66F 11/04* (2006.01)
*B66F 17/00* (2006.01)
*E04H 12/24* (2006.01)

(52) U.S. Cl.
CPC .............. *H02J 7/00* (2013.01); *B66F 11/044* (2013.01); *B66F 11/046* (2013.01); *B66F 17/006* (2013.01); *E04H 12/24* (2013.01); *H02J 2300/22* (2020.01); *H02J 2300/24* (2020.01)

(58) Field of Classification Search
CPC ...... H02J 2300/22; H02J 2300/24; H02J 7/00; E04H 12/24; B66F 11/044; B66F 11/046; B66F 17/006
USPC ................ 320/101, 107; 182/204; 52/745.17
See application file for complete search history.

(56) References Cited

U.S. PATENT DOCUMENTS

| | | | |
|---|---|---|---|
| 4,710,977 A | 12/1987 | Lemelson | |
| 4,721,213 A | 1/1988 | Eitel | |
| 4,762,199 A | 8/1988 | Holmes | |
| 4,917,213 A | 4/1990 | Kessler et al. | |
| 4,928,319 A | 5/1990 | Pitt et al. | |
| 4,998,294 A | 3/1991 | Banks et al. | |
| 5,074,489 A | 12/1991 | Gamzon | |
| 5,465,854 A | 11/1995 | Sturm et al. | |
| 5,730,305 A | 3/1998 | Ichiba et al. | |
| 5,744,936 A * | 4/1998 | Kawakami | H02J 7/0024 320/120 |
| 6,044,991 A | 4/2000 | Freudenthal et al. | |
| 6,325,330 B1 | 12/2001 | Lavan | |
| 6,325,749 B1 | 12/2001 | Inokuchi et al. | |

(Continued)

*Primary Examiner* — Edward Tso
*Assistant Examiner* — Aaron Piggush
(74) *Attorney, Agent, or Firm* — Simmons Perrine PLC

(57) ABSTRACT

A system is disclosed which provides the ability to install a cross arm on a power pole utilizing an electrically isolated bucket which is free of all hydraulic components used by an operator in the bucket to manipulate the bucket. The system also utilizes an in-the-bucket rechargeable battery powered electric tool such as a saw, drill etc. without a need for a hydraulic electric generator in the bucket. The system includes the ability to provide communication to and from and to supply electrical power to remote portions of an electrically isolated boom, by transmitting optical power and control signals through an electrically non-conductive optical fiber.

8 Claims, 15 Drawing Sheets

(56) References Cited

U.S. PATENT DOCUMENTS

| | | | |
|---|---|---|---|
| 6,707,274 B1 | 3/2004 | Karr | |
| 6,744,372 B1 | 6/2004 | Shaw et al. | |
| 6,842,119 B2 | 1/2005 | Nurse et al. | |
| 7,194,358 B2 | 3/2007 | Callaghan et al. | |
| 7,359,647 B1 | 4/2008 | Faria et al. | |
| 7,932,626 B2 | 4/2011 | Stoner | |
| 7,941,022 B1 | 5/2011 | Schaffner et al. | |
| 8,030,888 B2 | 10/2011 | Pandya et al. | |
| 8,532,497 B2 | 9/2013 | Chan et al. | |
| 8,893,710 B2 | 11/2014 | Geris | |
| 8,971,722 B2 | 3/2015 | Chan et al. | |
| 8,982,333 B2 | 3/2015 | Guetta et al. | |
| 9,090,315 B1 | 7/2015 | Stone et al. | |
| 2004/0108837 A1 | 6/2004 | Lai et al. | |
| 2006/0250276 A1 | 11/2006 | Levinson | |
| 2008/0166133 A1 | 7/2008 | Hsiao | |
| 2010/0214094 A1 | 8/2010 | Givens et al. | |
| 2011/0291615 A1 | 12/2011 | Pandya et al. | |
| 2012/0112531 A1* | 5/2012 | Kesler | H02J 50/60 307/9.1 |
| 2013/0209109 A1* | 8/2013 | Georgiano | B66F 11/046 398/140 |
| 2013/0319792 A1 | 12/2013 | Christian et al. | |
| 2016/0049849 A1* | 2/2016 | Boger | B66F 11/046 385/100 |
| 2017/0211765 A1* | 7/2017 | Walker | B66F 11/04 |

* cited by examiner

SYSTEM AND METHOD FOR INSTALLING A CROSS ARM ON A UTILITY POLE

CLAIM OF PRIORITY

The present application is a continuation application for the non-provisional application with Ser. No. 17/063,091 filed on Oct. 5, 2020, which application was a continuation application of the non-provisional application with Ser. No. 15/440,957 filed Feb. 23, 2017, now U.S. Pat. No. 10,794,079 issued Oct. 6, 2020, claims the benefit of the filing date of provisional patent application having Ser. No. 62/299,264 filed Feb. 24, 2016 by the same inventor, which applications are incorporated herein in their entirety by this reference.

FIELD OF THE INVENTION

The present invention generally relates to utility pole installation and maintenance with insulated aerial work platforms, and more particularly relates to utility pole cross arm installations using insulated bucket trucks with in-the-bucket controls.

BACKGROUND OF THE INVENTION

In the past, equipment employing remotely located control stations has been common. In the electrical and telecommunications industries, for example, elevated work platforms (EWPs), such as aerial devices, are commonly used to position personnel for work on utility lines, utility poles, transformers, and other elevated equipment. Such devices are also used for a range of other applications, such as tree trimming, photography, and street and spotlight maintenance. These devices typically include a telescoping and/or articulating boom mounted on a truck bed or otherwise supported by a vehicle chassis. A personnel-carrying platform, also referred to as a bucket or basket, is attached to a portion of the boom distal of the vehicle chassis (i.e. the boom tip). These platforms may be capable of carrying one or more people, and the boom may include supplemental tools or devices proximate the platform for lifting loads or performing other functions. These devices include control systems with control interfaces located at the platform to enable operators positioned in the platform to control operation of the boom and other devices. Using a control interface located at the platform, for example, an operator may adjust the rotation, extension and articulation of the boom to best position the platform for access to a work site. Aerial devices used in areas that include aerial power lines include electrically insulated boom portions and/or platforms with high electrical resistance, to reduce the risk of electrocution of the personnel in the EWP. Often electric power, for use at the bucket, is provisioned to the bucket for tools and/or lighting, by a hydraulic motor/generator which is electrically isolated from the ground.

While these types of insulated EWPs have been successfully deployed in the past, often the space consumed in the bucket by hydraulic controls, hydraulic motor/generators and hydraulic hoses and the associated reduction in available payload has caused problems for some activities. More specifically, a cross arm installation on a utility pole often requires multiple tools, and of course the bulky and cumbersome cross arm itself and associated mounting hardware, etc. Moreover, because of the size and weight of the cross arm, this activity often requires even more free space to move about within the bucket than other relatively simple tasks. This compounding of problems can become especially problematic if much of the space and payload of the bucket has been reduced by in-the-bucket hydraulic components.

Consequently, there exists a need for improved methods and systems for installing cross arms on utility poles.

SUMMARY OF THE INVENTION

It is an object of the present invention to provide a system for installing a cross arm on a utility pole.

It is a feature of the present invention to utilize an electrically insulated bucket without in the bucket hydraulics.

It is an advantage of the present invention to reduce the space consumed by and the weight of hydraulic system components in an electrically insulated bucket.

The present invention is an apparatus and method for Installing a Cross Arm on a Utility Pole.

Accordingly, the present invention is a method of:
 providing an elevated work platform (EWP) on a mobile base;
 where the EWP is isolated from electrical connection with the earth;
 providing on said EWP a means for providing electric power to recharge a battery located on said EWP, said battery configured for providing battery power for use by an electric tool, where the means for providing electric power excludes hydraulic power generating equipment.

BRIEF DESCRIPTION OF THE DRAWINGS

The invention may be more fully understood by reading the foregoing description of the preferred embodiments of the invention, in conjunction with the appended drawing wherein.

DETAILED DESCRIPTION

Although described with particular reference to utility pole maintenance, such as cross arm installation, the systems and methods of the present invention can be implemented in many different ways and with different types of systems and for different purposes, the embodiments described herein are merely examples of the many possible variations.

Figure 1:
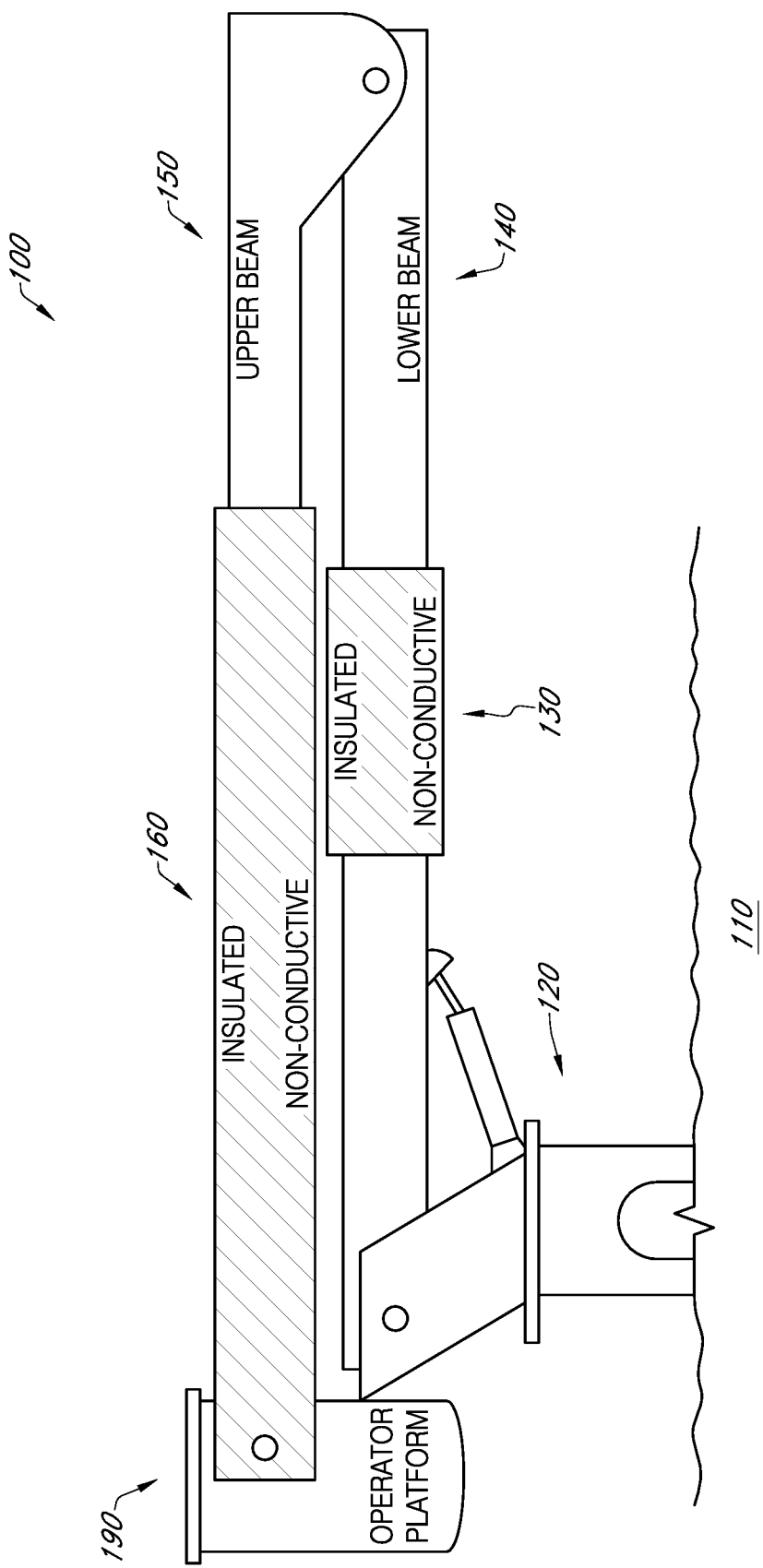
FIG. 1 is an elevation view of an electrically insulated bucket truck of the prior art.

Now referring to the drawings where like numerals refer to like matter throughout, there is shown in FIG. 1 an elevation view of portions of a bucket truck boom of the prior art, generally designated 100. Also shown is a mobile EWP vehicle platform 110 with a mobile EWP vehicle turntable/turret 120 attached thereto. In some embodiments, there will be a telescopic boom. In other embodiments, there may be a single boom. Still in other embodiments, there may be a conductive lower beam portion 140 having a non-conductive insulated structural segment 130. Pivotally coupled to conductive lower beam portion 140 is conductive upper beam portion 150, which has a non-conductive insulated structural segment 160. Coupled to non-conductive insulated structural segment 160 is an operator platform or bucket 190.

Figure 2:
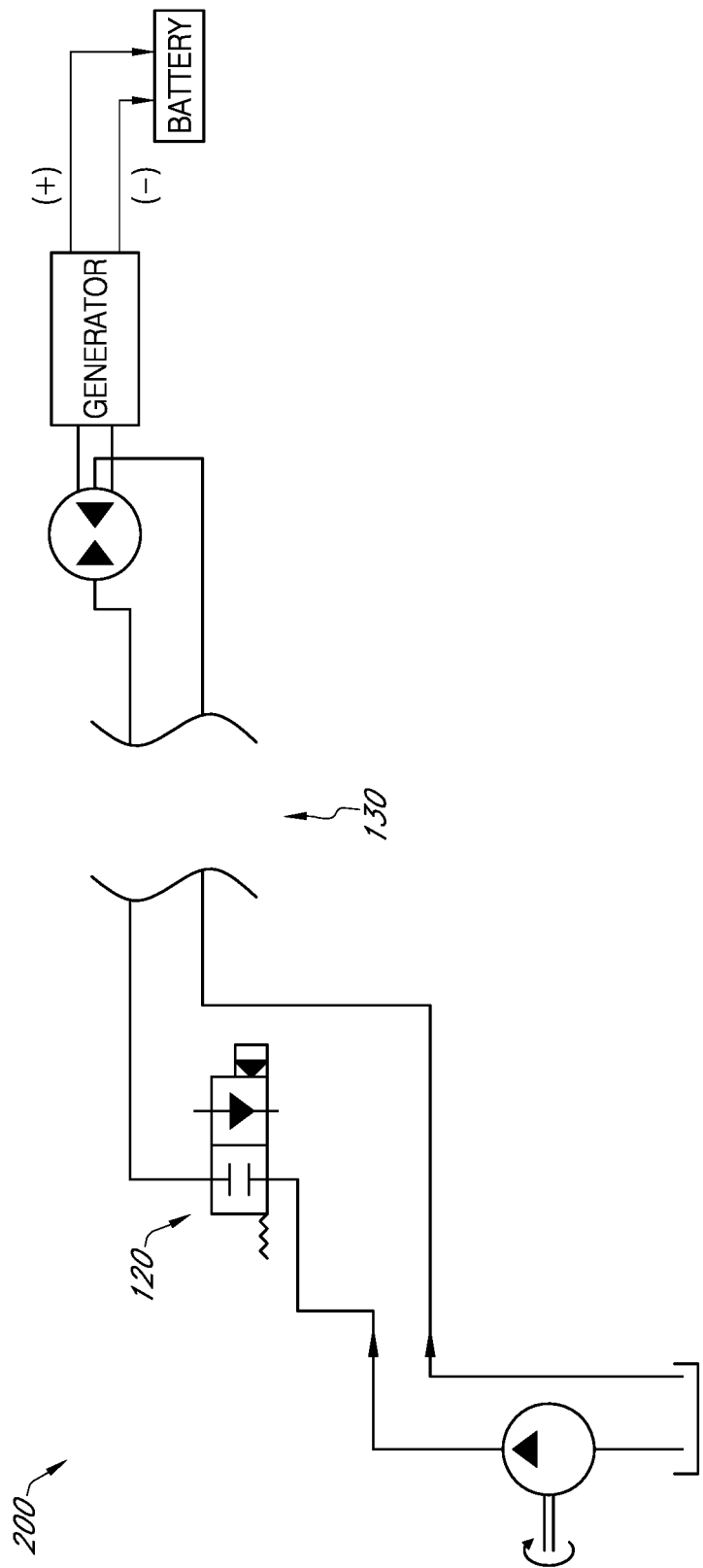
FIG. 2 is a simplified schematic diagram of a portion of a power generation and distribution system of the prior art which could be used with an insulated bucket truck as shown in FIG. 1.

Now referring to FIG. 2, there is shown an example of one type of hydraulic system that is used to provide hydraulic power up an insulated boom. The components of this system are well known in the art and the details will vary between manufacturers. In most of these systems, there will be a segment of at least one boom which is made of a non-conductive material, such as a composite material. This can be a non-conductive insulated structural segment 130 and it could also be the turntable or mobile EWP vehicle turret 120 which key portions made of non-conductive material.

Figure 3:
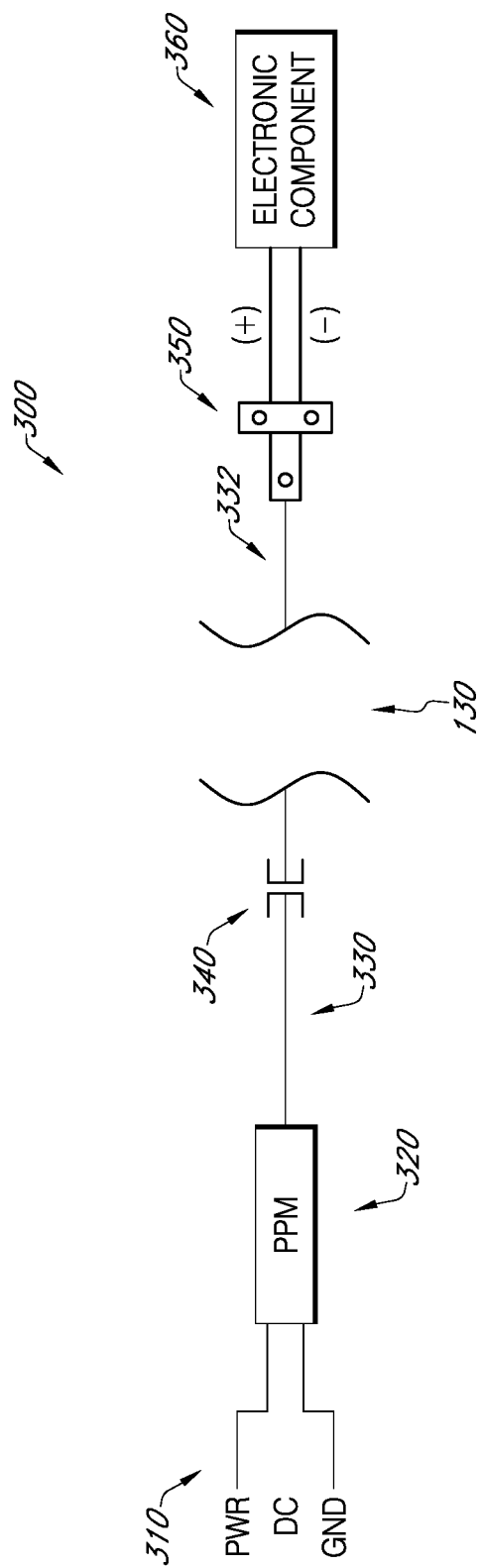
FIG. 3 is a simplified block diagram view of a single power unit embodiment of the present invention.

Now referring to FIG. 3, there is shown a single power unit 300 with a vehicle DC power source 310 which could be a wide variety of voltages depending upon application, industry and country including, but not limited to a 12 volt power source, such as a vehicle alternator and a battery or suitable alternatives which could have a lower voltage. A photonic power module (PPM) 320 is shown which may include a laser diode, electronic drive circuit and a heat sink all in combination to convert DC power into light. One suitable photonic power module 320 could be a PPM-500-K-FC-4E-200 available from Lumentum Operations LLC 400 North McCarthy Blvd Milpitas, CA 95035 United States f.k.a. JDSU and available online at www.lumentum.com Fiber optic cable 330 could be an MMSS-06-26-XX,XX-D-K-LUS or equivalent available from SAMTEC USA 520 Park East Boulevard P.O. Box 1147 New Albany, IN 47151-1147 U.S.A. online at www.samtec.com/optics.

One or more optical connectors 340 can be used but are not absolutely required in all applications. This optical fiber will extend across the entire non-conductive insulated structural segment 130 or other insulated section of the boom. Optical fiber electric power generating end 332 is coupled to a photovoltaic power converter 350, which could be chosen from various commercially available photoelectric devices. The particular photovoltaic power converter 350 used will depend upon the details of a particular application including, but not limited to: the photonic power module 320 used and the intermediate fiber optic cable 330, as well as any optical connector 340. The electric output of photovoltaic power converter 350 is shown provided to an electronic component 360, which is intended to represent a wide variety of possible devices which could utilize an input of DC power.

Figure 4:
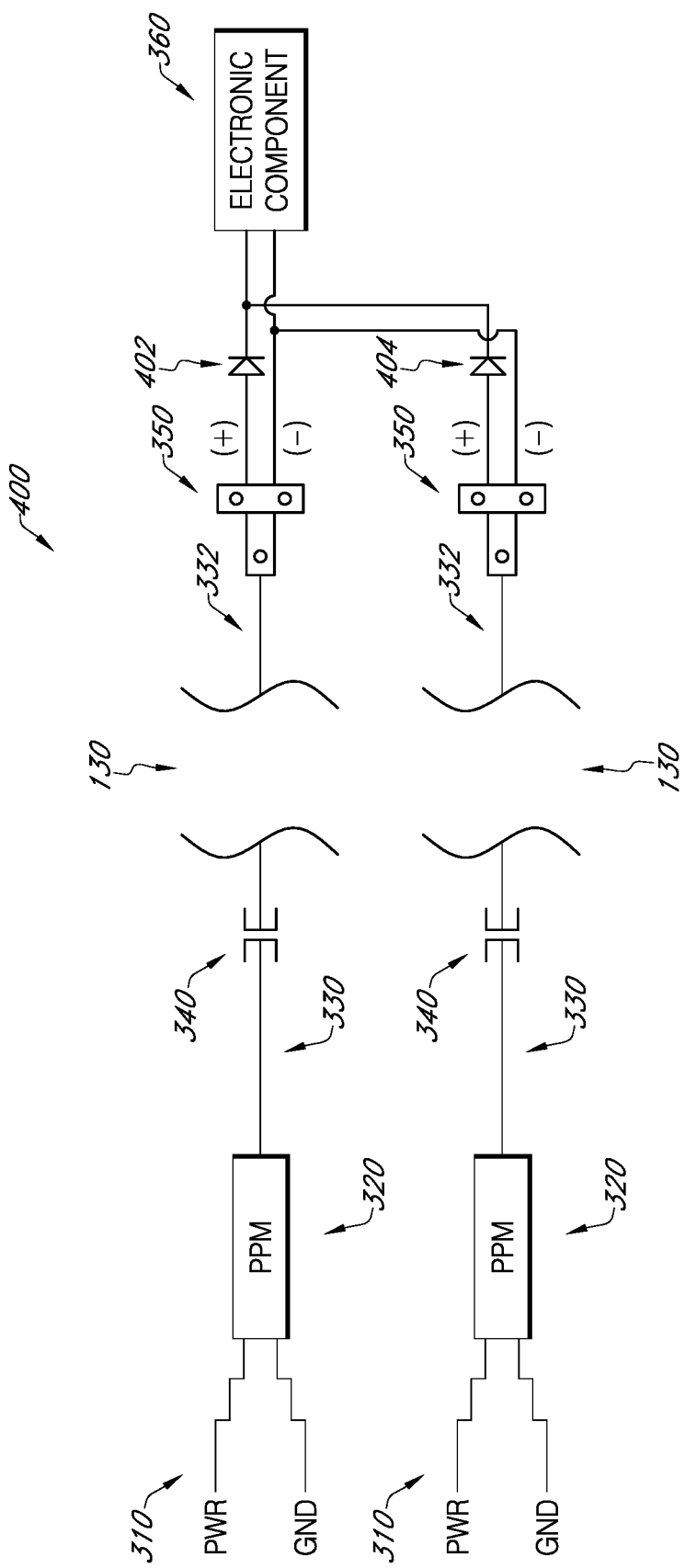
FIG. 4 is a simplified block diagram view of a double power unit embodiment of the present invention.

Now referring to FIG. 4, there is shown a dual power unit 400 which is an example of how multiple single power units 300 could be combined to make a higher power system. These single power units 300 are combined between the photovoltaic power converter 350 and the electronic component 360 and utilize a first diode 402 and second diode 404. Of course, this could be scaled up to any number of single power units 300.

Figure 5:
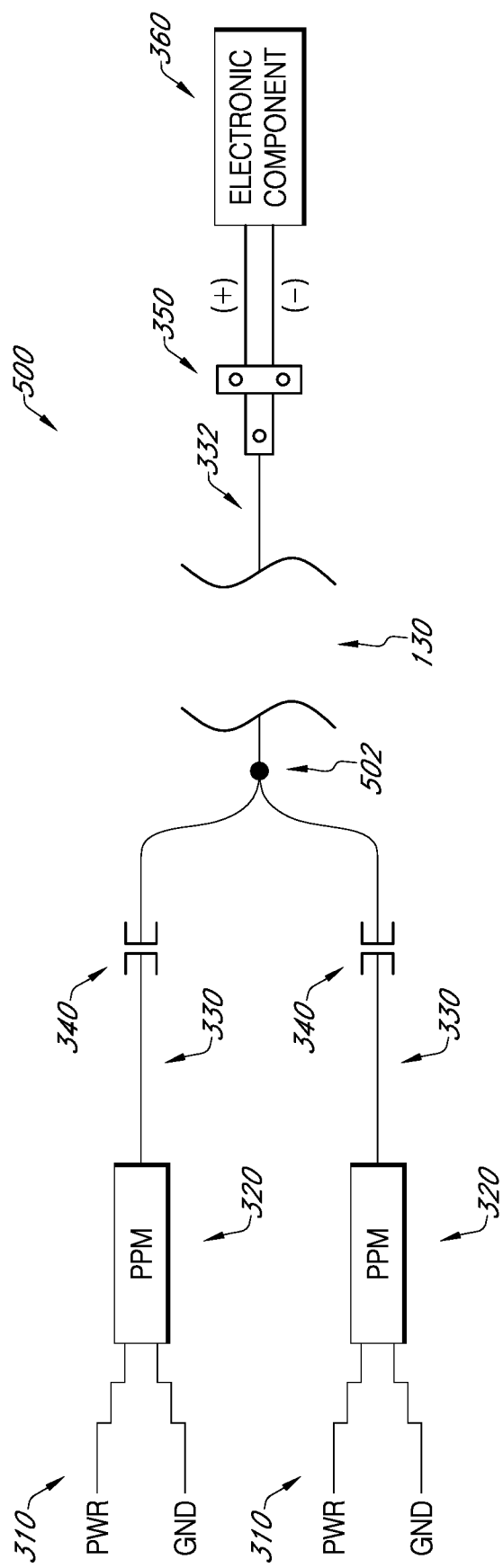
FIG. 5 is a simplified block diagram view of a single power unit embodiment of the present invention, with redundant photonic power modules.

Now referring to FIG. 5, there is shown a variation of the single power unit 300 which has multiple photonic power module 320 coupled in parallel at 502 to provide for a more stable source of light. Still other variations could be made as well.

Figure 6:
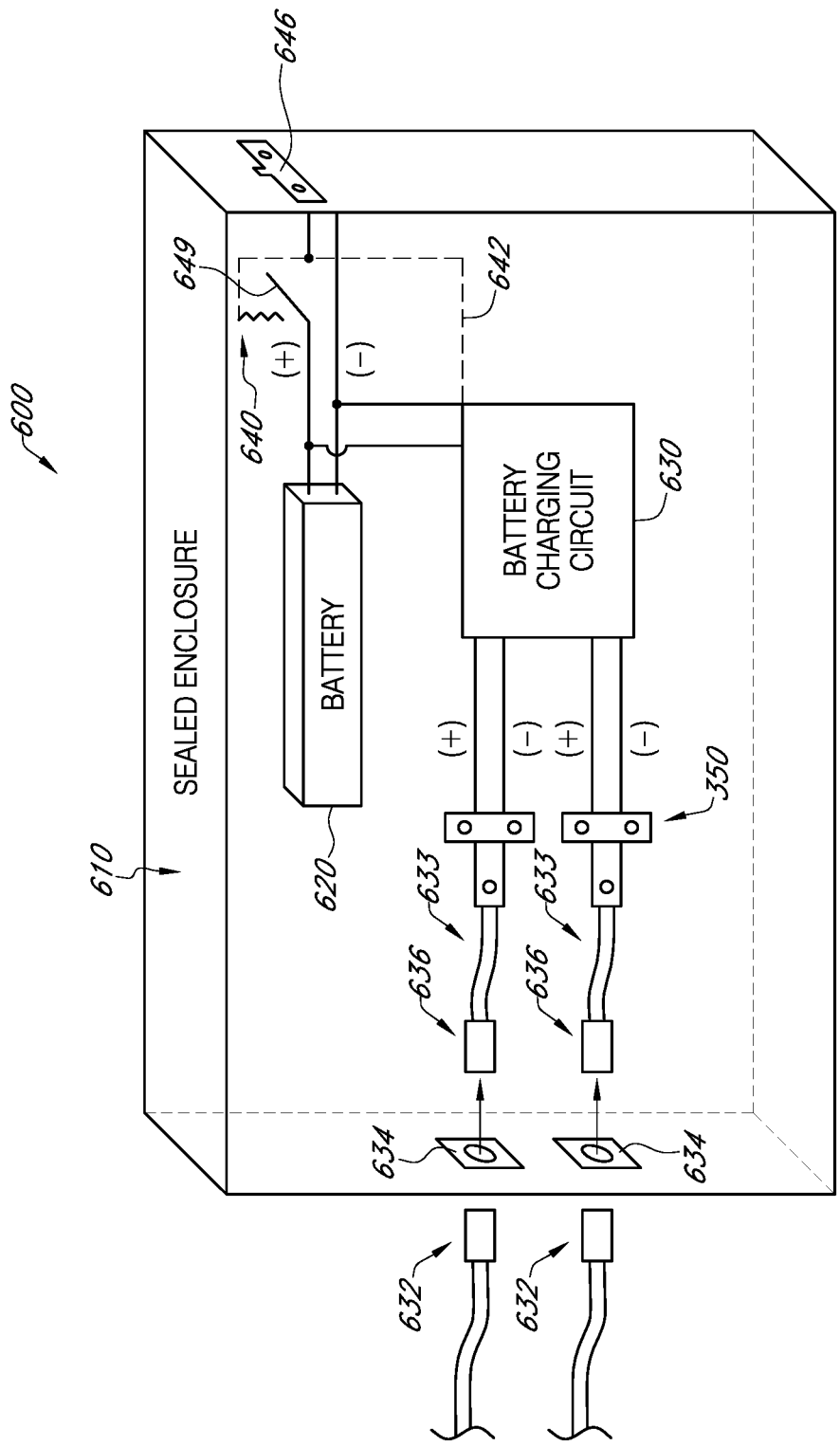
FIG. 6 is a simplified block diagram view of an isolated electric power source module embodiment of the present invention.

Now referring to FIG. 6, there is shown an isolated power source module 600 which represent a version of an electronic component 360 which integrated therein the photovoltaic power converters 350 of FIG. 4. More specifically, there is shown two optical fiber electric power generating ends 332 coupled to two fiber end connector 632, which are coupled to a pair of fiber optic bulkhead connector 634 in the side of sealed enclosure 610. Battery charging circuit 630 is shown coupled to the electrical output of photovoltaic power converters 350. In-the-bucket battery 620 is shown coupled to the output of battery charging circuit 630. Also shown is a latching relay 640 which includes a relay switch portion 644. Latching relay 640 is provisioned with a signal which is representative of whether the photovoltaic power converter 350 is outputting electric power. The purpose of this latching relay 640 is to signal that the upper controls should be turned ON. The light from the laser diode would signal that the system is ON and 'OK' to pull power from the battery. When the EWP is turned OFF, the battery would be disconnected so there would not be a drain on the battery when the system is OFF. Also shown is a bulkhead electrical connector 646 which is used to connect various power tools or DC power appliances.

In operation, an operator of an EWP could need multiple electric tools. Instead of bringing a wide variety of batteries for each tool, where these tools are usually used in series and very seldom simultaneously and instead of filling the space in the bucket with several batteries for each tool, the operator could use a live adapter which mimics the connection between the battery and its associated tool and which has an electric cord which is plugged into the bulkhead electrical connector 646. This could mean that no heavy and cumbersome batteries are needed to operate a large variety of tools.

Figure 7:
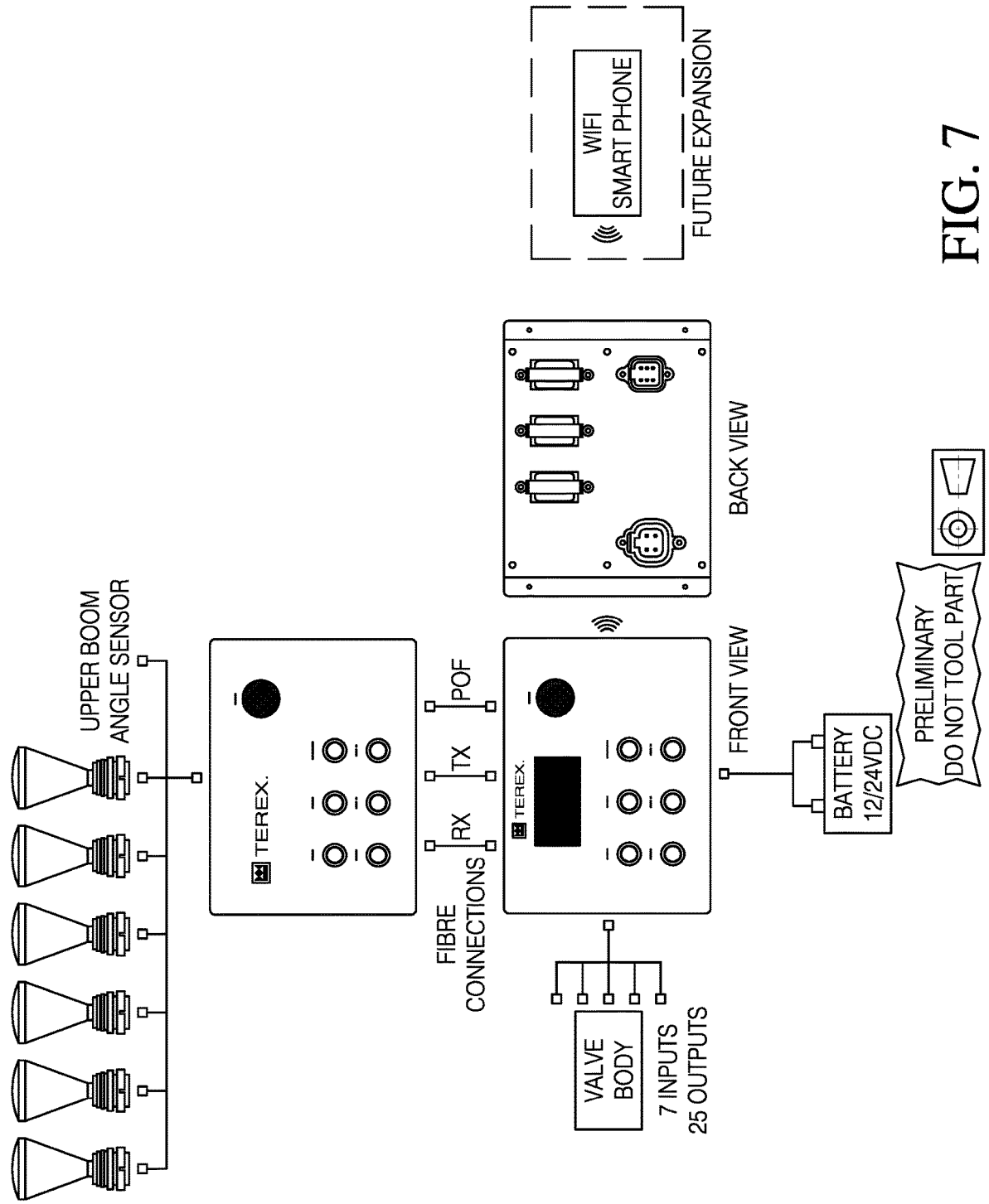
FIG. 7 is a simplified block diagram view of a low power non-hydraulic bucket control, power and communication system embodiment of the present invention.

Now referring to FIG. 7, there is shown a user interface of a control system which would be used to control the boom and the bucket. In this example, there would be no hydraulic equipment in the bucket, all of the hydraulics could be located outside of the bucket and the control signals could be communicated around the bucket truck using data transmitted over the fiber optic cable 330 or separate optical fibers, or even over Wi-Fi, or other rf communication.

Figure 8:
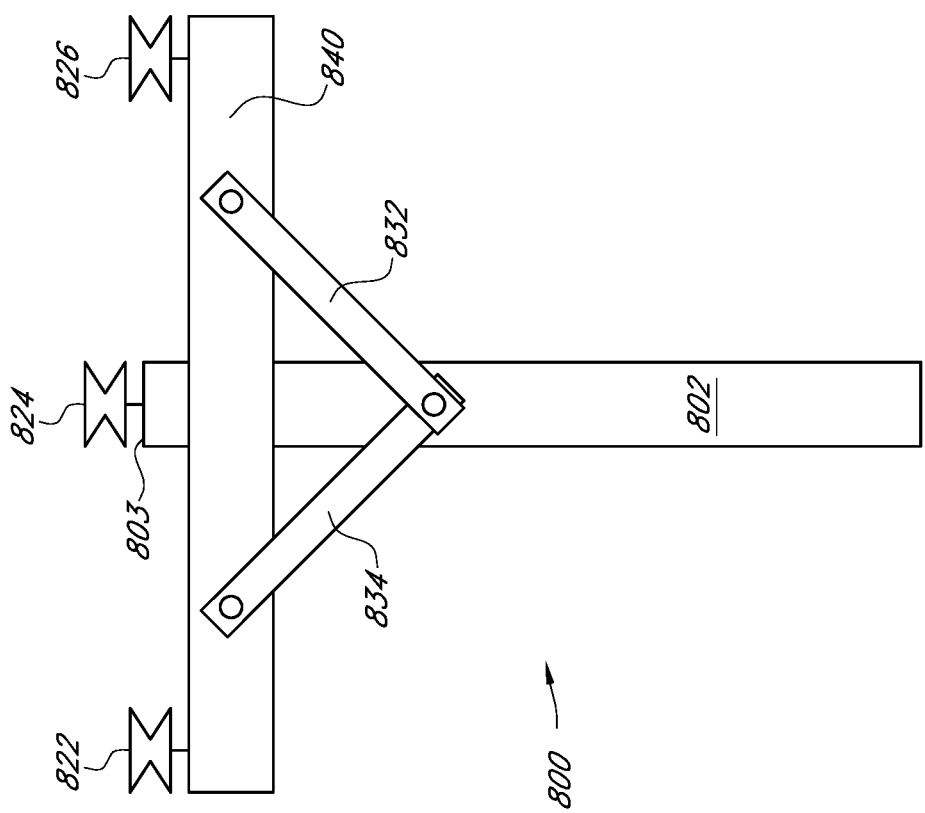
FIG. 8 is a simplified view of a utility pole of the prior art.

Now referring to FIG. 8, there is shown a utility pole assembly 800 which contains a utility pole 802 having a utility pole top end 803. A cross arm 840 is shown disposed near the utility pole top end 803 and it is supported by first pole to cross arm brace 832 and second pole to cross arm brace 834. Also shown are first insulator 822, second insulator 824 and third insulator 826.

Figure 9:
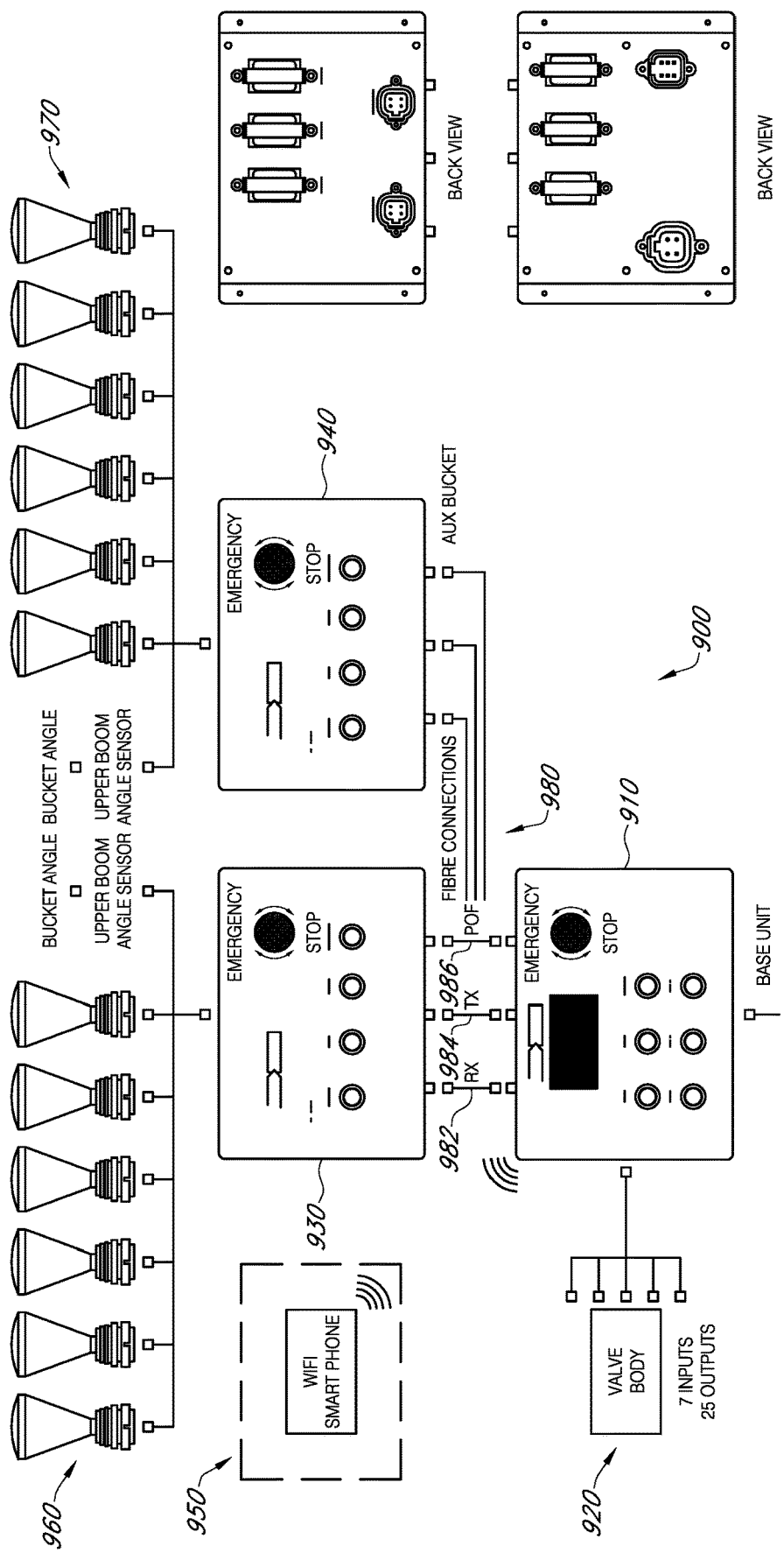
FIG. 9 is a simplified block diagram view of a low power non-hydraulic bucket control, power and communication system with an auxiliary panel embodiment of the present invention.

Now referring to FIG. 9, there is shown a system generally designated 900 which is a variation of the system of FIG. 7, which includes display power over fiber logic valve drive module 910, hydraulic valve control system 920, remote switch panel 930, auxiliary switch panel 940, smart phone 950, remote sensory system 960, auxiliary sensor system 970, and fiber optic distribution system 980. System 900 is disposed on the mobile EWP vehicle platform 110 which has coupled thereto operator platform or bucket 190.

Display power over fiber logic valve drive module 910 is a central component of the system 900 it has 2 Controller Area Network (CAN) connections, connections for PoF, PoF Rx/Tx, input/output connections, USB, and vehicle battery power connections. It provides a human user interface via an LCD and numerous switches, indicators, alarms and data entry functions and is electrically coupled to and provides electric control signals to a hydraulic valve control system 920 to manipulate the hydraulic operation of the operator platform or bucket 190 and other hydraulic functions. Display power over fiber logic valve drive module 910 is optically coupled to remote switch panel 930 and auxiliary switch panel 940 via fiber optic distribution system 980. In some embodiments, remote switch panel 930 is configured to provide a WiFi network, includes a GPS, CDMA and GMRS modules and associated antenna connections, as well as audible alarms. This system is designed to operate in a High Electric Field Environment up to 765 KV. Display power over fiber logic valve drive module 910 is also configured with environmental and vehicle sensors.

Also shown is remote switch panel 930, which is disposed in operator platform or bucket 190, and provides an operator therein with the ability to manipulate its position and orientation with an included joystick, which generates electrical signals in response to human interaction. This remote switch panel 930 is free of hydraulic couplings of any type and is electrically isolated from the ground and the mobile EWP vehicle platform 110. In one embodiment, remote switch panel 930 is optically coupled to remote sensory system 960. In another embodiment, the system could be used to measure loads at the bucket. The system would use lasers and photonic cells to power an upper control system which would read strain gauges at the bucket along with measuring jib angle and jib length. When a predetermined load is reached, an alarm would sound at the bucket and at the base. This would alarm the operator that they are lifting more than a predetermine threshold related to machine capacity. In still another embodiment, an angle sensor may be located on the boom elbow and be configured to transmit data optically back to the base, if it is located below an electrically isolated section of the boom. If the angle sensor is located above or in an electrically isolated region, then the data could be electrically sent to the remote switch panel 930 or auxiliary switch panel 940, where it will be optically communicated back to the display power over fiber logic valve drive module 910. In still another embodiment, all of the sensors and alarms that are located remotely, in, at or near the bucket could be electrically coupled to the remote switch panel 930 or auxiliary switch panel 940.

Also shown is auxiliary switch panel 940, which is similar to remote switch panel 930, which can be similarly optically or electrically coupled to auxiliary sensor system 970.

Smart phone 950 may be configured with an app for monitoring and controlling the portions of the system 900 via a WiFi or Bluetooth connection with a component in display power over fiber logic valve drive module 910 or the remainder of the system 900.

Remote sensory system 960 is provided to determine the location, orientation, position etc. of an upper portion of the boom. These sensors can take many forms, they can be position sensors monitoring the relative position of articulating members, they can be accelerometers, environmental sensors, such as but not limited to temperature, wind speed, humidity, light levels, electric field sensors, magnetic field sensors, they can be video cameras (visual spectrum, it and uv) with computer aided image, thermal pattern and e/m field recognition, sensors for sonar, lidar, radar and any suitable substitute, such as GPS in combination with GIS and map information of predetermined locations of power lines. One particular application is to determine the proximity of the boom to electric power lines. If one or more of the sensors determines that electric power line may be close to the boom, an alarm will sound and, in some embodiments, the boom will stop further movement or may be automated to retreat from wires if they are in motion, with respect to the boom. In one embodiment, it is optically coupled to remote switch panel 930 and in another, it may be electrically coupled.

Fiber optic distribution system 980 is provided to optically couple optical transmitters and receivers at various locations in the system 900.

Figure 10:
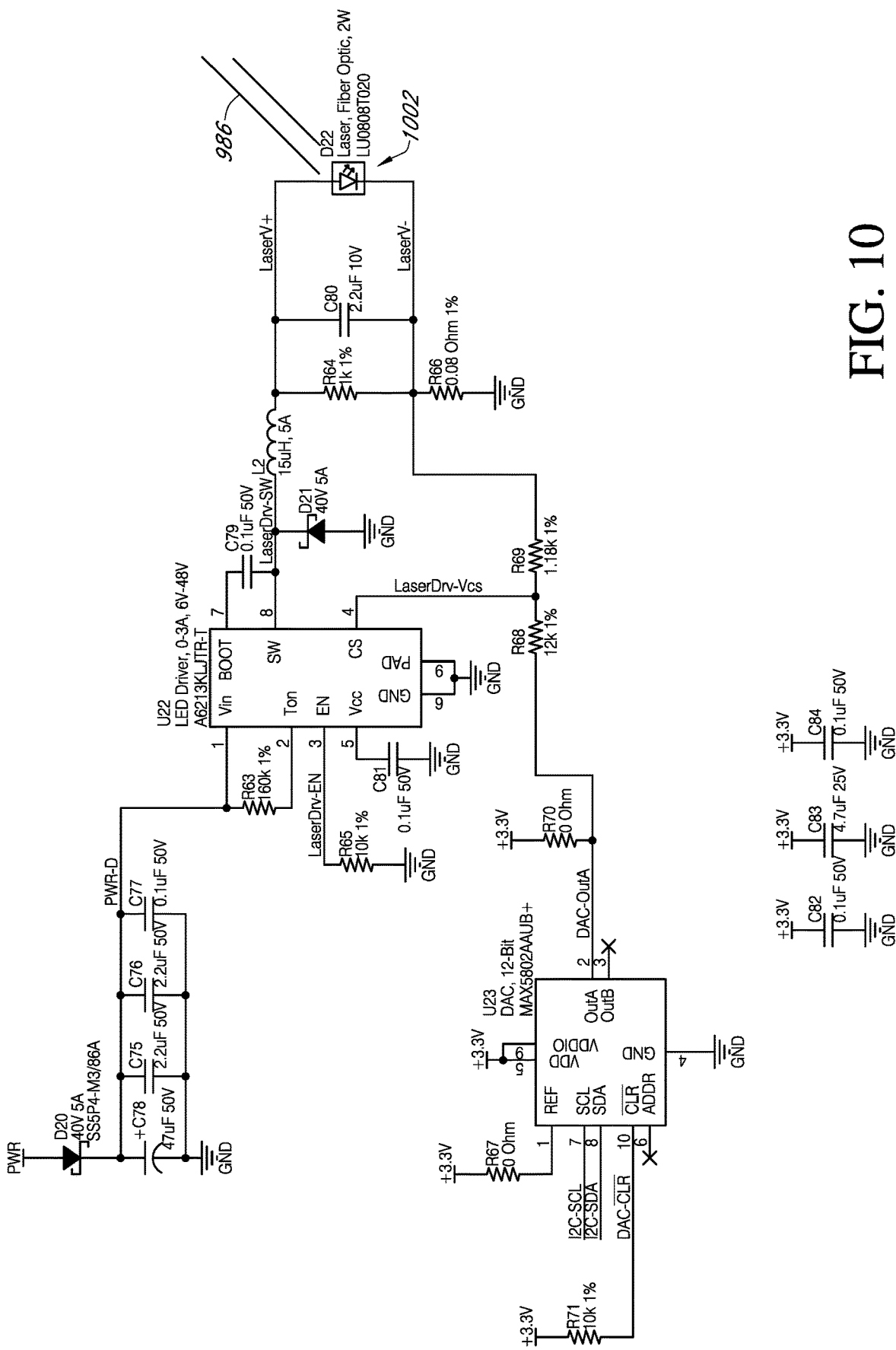
FIG. 10 is a simplified schematic diagram of a portion of a photonic power generation system of the display power over fiber logic valve drive module of the present invention.

Now referring to FIG. 10, there is shown a photonic power module 1002 which can be a laser diode or a suitable substitute disposed in display power over fiber logic valve drive module 910. Photonic power module 1002 is optically coupled to power over fiber fiber system 986, which is not electrically conductive. These two items in combination provide for the ability to deliver power to an electrically isolated portion of the boom. It should be understood that the optical power output of photonic power module 1002 could be made larger by utilizing a more powerful laser diode or a combination of laser diodes operating in parallel similar to FIG. 4 or both. In some configurations, multiple diodes could be used in manner similar to FIG. 5 to provide redundancy.

Figure 11:
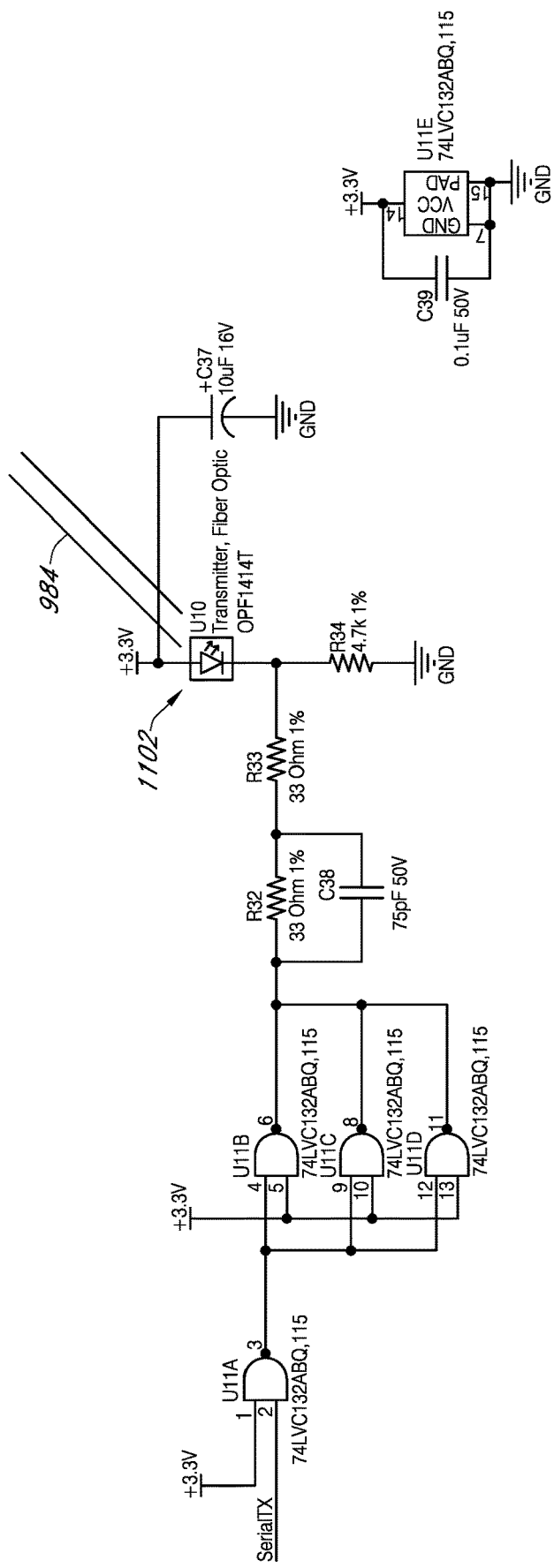
FIG. 11 is a simplified schematic diagram of a portion of a photonic communication and power generation system of the display power over fiber logic valve drive module of the present invention.

Now referring to FIG. 11, there is shown a communication photonic power module 1102 which can be a laser diode or a suitable substitute disposed in display power over fiber logic valve drive module 910. Communication photonic power module 1102 is optically coupled to base unit communication transmitting fiber 984 or a suitable substitute, which is not electrically conductive. These two items in combination provide for the ability to deliver communication signals and, optionally, power to an electrically isolated portion of the boom. It should be understood that communication photonic power module 1102 could be made larger by utilizing a more powerful laser diode or a combination of laser diodes operating in parallel similar to FIG. 4 or both. In some configurations, multiple diodes could be used in manner similar to FIG. 5 to provide redundancy.

Figure 12:
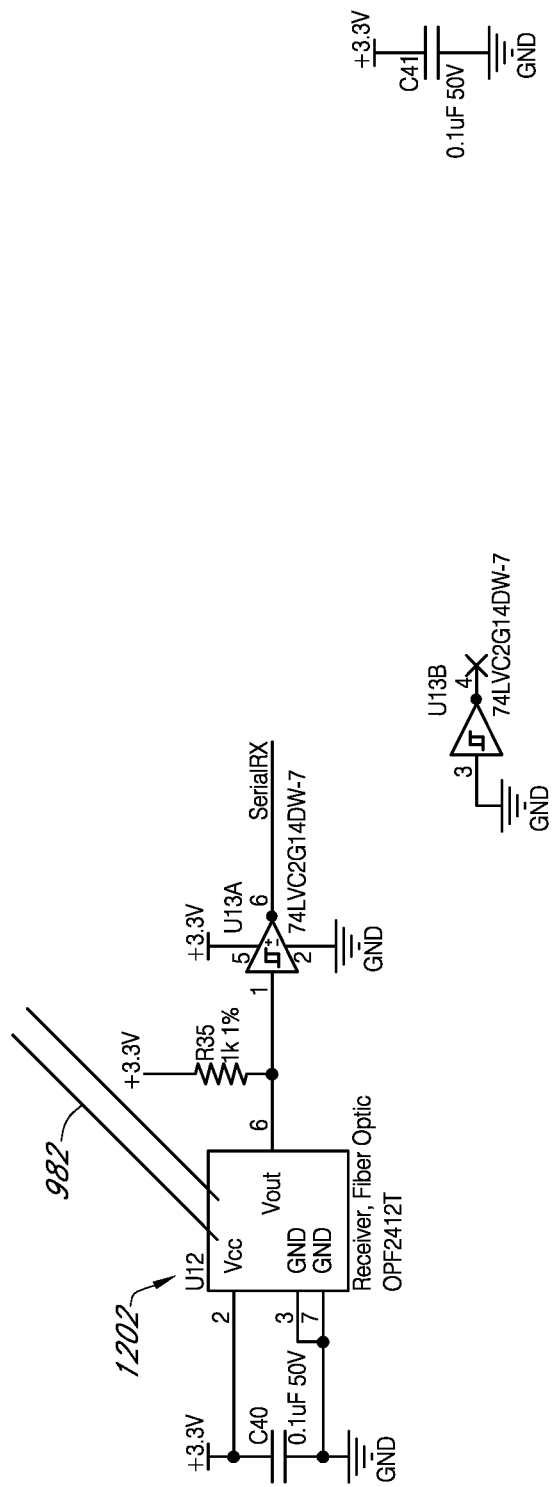
FIG. 12 is a simplified schematic diagram of a portion of a photonic communication system of the display power over fiber logic valve drive module of the present invention.

Now referring to FIG. 12, there is shown a communication photovoltaic power convertor 1202 which can be a light sensor, or a suitable substitute, disposed in display power over fiber logic valve drive module 910. Communication photovoltaic power convertor 1202 is optically coupled to base unit base unit communication receiving fiber 982 or a suitable substitute, which is not electrically conductive. These two items, in combination, provide for the ability to deliver communication signals and optionally power to an electrically isolated portion of the boom.

Figure 13:
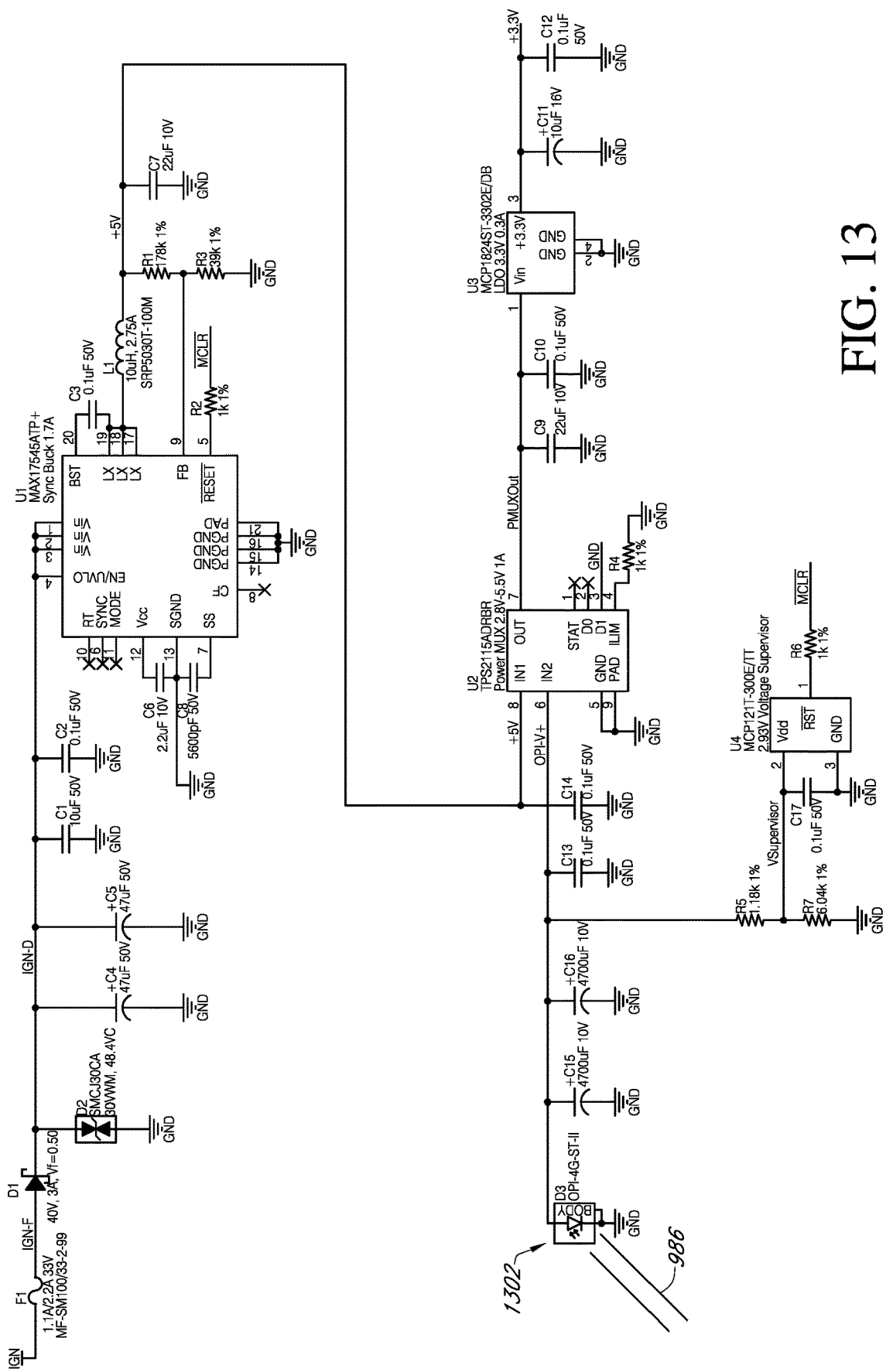
FIG. 13 is a simplified schematic diagram of a portion of a photonic power generation system of the remote switch panel of the present invention.

Now referring to FIG. 13, there is shown a photovoltaic power convertor 1302 disposed in remote switch panel 930 and which could be optically matched to photonic power module 1002. It should be understood that photovoltaic power convertor 1302 could be made greater by utilizing a more efficient sensor or a combination sensor operating in parallel similar to FIG. 4 or both. In some configurations, multiple sensor could be used in manner similar to FIG. 5 to provide redundancy. The precise implementation of the present invention will vary depending upon the particular application.

Figure 14:
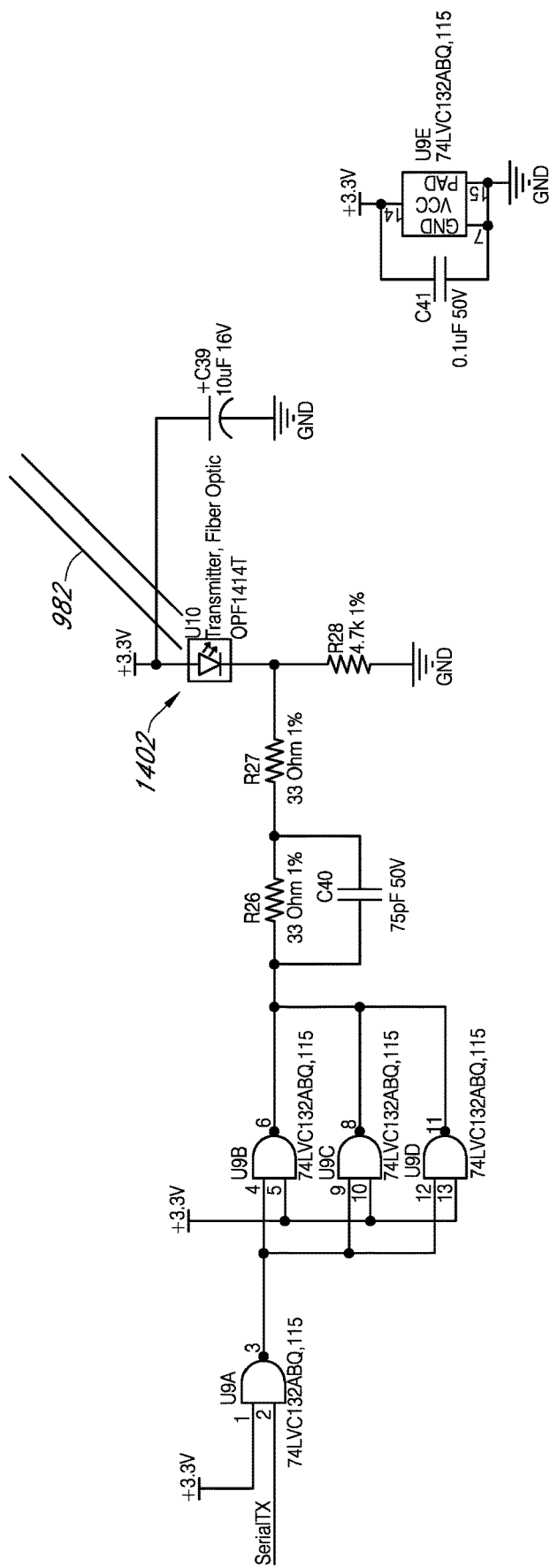
FIG. 14 is a simplified schematic diagram of a portion of a photonic communication and power generation system of the remote switch panel of the present invention.

Now referring to FIG. 14, there is shown a communication photonic power module 1402 which can be a laser diode or a suitable substitute disposed in remote switch panel 930. Communication photonic power module 1402 is optically coupled to base unit communication transmitting fiber 982 or a suitable substitute, which is not electrically conductive. These two items, in combination, provide for the ability to deliver communication signals and from optionally power to and/or from an electrically isolated portion of the boom. It should be understood that communication photonic power module 1402 could be made larger by utilizing a more powerful laser diode or a combination of laser diodes operating in parallel similar to FIG. 4 or both. In some configurations, multiple diodes could be used in manner similar to FIG. 5 to provide redundancy.

Figure 15:
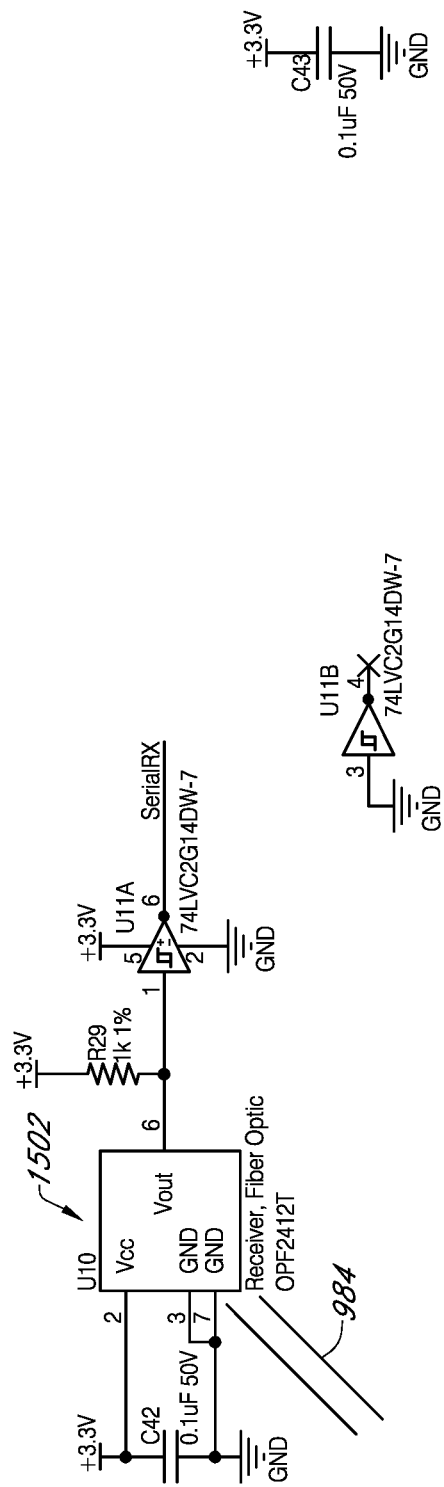
FIG. 15 is a simplified schematic diagram of a portion of a photonic power communication system of the remote switch panel of the present invention.

Now referring to FIG. 15, there is shown a communication photovoltaic power convertor 1502 which can be a light sensor or a suitable substitute disposed in remote switch panel 930. Communication photovoltaic power convertor 1502 is optically coupled to base unit base unit communication receiving fiber 984 or a suitable substitute, which is not electrically conductive. These two items, in combination, provide for the ability to deliver communication signals and optionally power to and/or from an electrically isolated portion of the boom.

It is thought that the method and apparatus of the present invention will be understood from the foregoing description and that it will be apparent that various changes may be made in the form, construct steps and arrangement of the parts and steps thereof without departing from the spirit and scope of the invention or sacrificing all of their material advantages. The form herein described is merely a preferred exemplary embodiment thereof.

I claim:

1. A system for providing electric power in an elevated work platform (EWP), comprising:
 a. a photonic power module configured to generate light from electrical energy;
 b. an optical fiber for transmitting said light;
 c. a photovoltaic power converter configured to receive said light and generate electrical power;
 d. a battery charging circuit coupled to the photovoltaic power converter;
 e. a rechargeable battery coupled to the battery charging circuit; and
 f. a latching relay configured to control power distribution from the rechargeable battery based on a signal indicating power output from the photovoltaic power converter, wherein the latching relay comprises a relay switch portion configured to:
  i. connect the rechargeable battery to a power distribution system to signal that upper controls of the EWP should be turned ON when the signal indicates that the photovoltaic power converter is outputting electric power, and
  ii. disconnect the rechargeable battery from the power distribution system when the EWP is turned OFF to prevent battery drain during system downtime.

2. The system of claim 1, wherein the photonic power module comprises:
 a. a laser diode;
 b. an electronic drive circuit; and
 c. a heat sink.

3. The system of claim 1, further comprising multiple photonic power modules coupled in parallel to provide a more stable source of light.

4. The system of claim 1, wherein the latching relay is configured to:
 a. connect the rechargeable battery to a power distribution system when the signal indicates that the photovoltaic power converter is outputting electric power; and
 b. disconnect the rechargeable battery from the power distribution system when the EWP is turned off.

5. A method for managing power in an electrically isolated elevated work platform (EWP), comprising:
 a. generating light from electrical energy using a photonic power module;
 b. transmitting the light through an optical fiber;
 c. converting the transmitted light into electrical power using a photovoltaic power converter;
 d. charging a rechargeable battery using the electrical power from the photovoltaic power converter;
 e. monitoring a signal indicating power output from the photovoltaic power converter; and
 f. controlling power distribution from the rechargeable battery using a latching relay based on the monitored signal; wherein the latching relay:
  i. connects the rechargeable battery to a power distribution system when the monitored signal indicates that the photovoltaic power converter is outputting electric power, thereby enabling power to be drawn from the battery; and
  ii. disconnects the rechargeable battery from the power distribution system when the EWP is turned off, thereby preventing battery drain when the system is not in use.

6. The method of claim 5, further comprising:
 a. connecting the rechargeable battery to a power distribution system when the signal indicates that the photovoltaic power converter is outputting electric power; and
 b. disconnecting the rechargeable battery from the power distribution system when the EWP is turned off.

7. A power management system for an electrically isolated elevated work platform (EWP), comprising:
 a. means for generating light from electrical energy;
 b. means for transmitting the generated light;
 c. means for converting the transmitted light into electrical power;
 d. means for charging a rechargeable battery using the electrical power;
 e. means for monitoring power output from the light-to-electrical power conversion; and
 f. means for controlling power distribution from the rechargeable battery based on the monitored power output; wherein the means for controlling power distribution:
  i. connects the rechargeable battery to a power distribution system when the monitored power output indicates that the light-to-electrical power conversion is occurring, enabling power to be drawn from the battery; and ii. disconnects the rechargeable battery from the power distribution system when the EWP is turned off, preventing battery drain when the system is not in use.

8. The power management system of claim 7, further comprising:

a. means for connecting the rechargeable battery to a power distribution system when power output is detected; and b. means for disconnecting the rechargeable battery from the power distribution system when the EWP is turned off.

\* \* \* \* \*